United States Patent [19]

Neely

[11] Patent Number: 4,592,426
[45] Date of Patent: Jun. 3, 1986

[54] UPPER TERMINATION WITH SLIDING SLEEVE SEALS

[75] Inventor: Stephen A. Neely, Long Beach, Calif.
[73] Assignee: Hughes Tool Company, Houston, Tex.
[21] Appl. No.: 679,787
[22] Filed: Dec. 10, 1984
[51] Int. Cl.[4] ...................... E21B 23/04; E21B 41/04; E21B 43/01
[52] U.S. Cl. .................................. 166/347; 166/344; 285/137.1; 285/920
[58] Field of Search ............... 166/347, 338, 339, 340, 166/341, 342, 343, 344, 350, 359, 360; 285/108, 95, 96, 24, 25, 26, 27, 28, 137 A, 137 R, DIG. 21

[56] References Cited

U.S. PATENT DOCUMENTS

| | | | |
|---|---|---|---|
| 2,725,122 | 11/1955 | Thorne | 285/101 X |
| 3,326,579 | 6/1967 | Fowler | 285/26 |
| 3,874,706 | 4/1975 | Arnold | 285/24 |
| 3,966,235 | 6/1976 | Lewis | 285/325 X |
| 4,403,658 | 9/1983 | Watkins | 166/355 |

OTHER PUBLICATIONS

Ser. No. 600662, 4/16/84, Regan.

Primary Examiner—Stephen J. Novosad
Assistant Examiner—David J. Bagnell
Attorney, Agent, or Firm—Robert A. Felsman; James E. Bradley

[57] ABSTRACT

A supporting connection system for a riser extending between a floating vessel and a subsea well utilizes a termination head that removably fits within a termination housing. The termination head and housing have radial ports that register with each other to transmit fluid between the vessel and the subsea well. A sliding sleeve is located in the radial port of the termination housing. The sleeve is reciprocated by hydraulic pressure between an open position removed from the termination head and a closed position with its forward end located inside the termination head radial passage. The forward end of the sliding sleeve seals within the termination head passage.

3 Claims, 4 Drawing Figures

UPPER TERMINATION WITH SLIDING SLEEVE SEALS

BACKGROUND OF THE INVENTION

1. Field of the Invention

This invention relates in general to equipment for drilling and producing subsea wells, and particularly to a seal assembly located at the top of a riser string extending between the subsea well and a floating, drilling or production platform.

2. Description of the Prior Art

In U.S. Pat. No. 4,403,658, Sept. 13, 1983, Watkins, a single stab union is shown for an offshore drilling or production platform. In the patent, at the top of the riser run or string, a termination head is adapted to be received within a termination housing. The termination housing has a number of radial ports that register with passages located in the termination head. These ports contain high pressure fluid for transmission between the vessel and a subsea well. If it is necessary to temporarily disconnect the lower end of the riser from the subsea well, the termination head can be pulled upward from the termination housing. The lines or hoses connected to the termination housing can remain in place, connected to the housing.

Seals are required to seal the junction of the termination housing radial ports with the termination head radial passages. In the patent, static elastomeric seals are shown encircling each outlet of the termination head ports.

SUMMARY OF THE INVENTION

In this invention, a movable seal is provided for sealing the radial passages between the termination head and termination housing. The seal assembly includes a sliding sleeve carried in the radial passage of the termination housing. The sleeve has a passage therethrough for transmitting fluid. The sleeve has a forward end which is dimensioned for sealing reception inside the radial passage of the termination head.

The sleeve also has an annular flange located in a chamber within the termination housing passage. The flange serves as a piston. The hydraulic fluid directed to the chamber on opposite sides of the piston retract and advance the sleeve into engagement with the termination head.

DESCRIPTION OF THE PREFERRED EMBODIMENT

Figure 1:
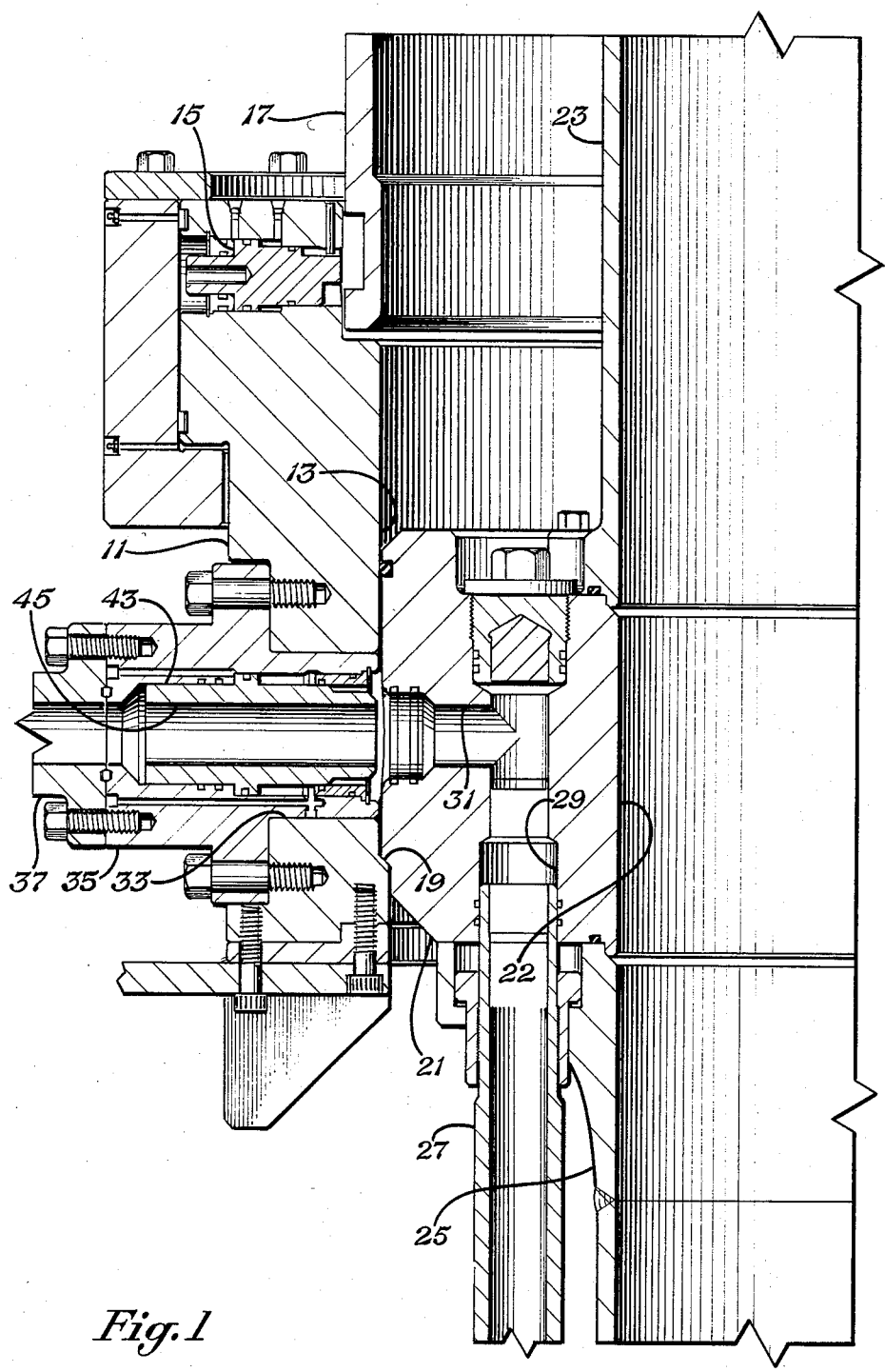
FIG. 1 is a partial vertical sectional view of a termination head and termination housing constructed in accordance with this invention, with the sliding sleeve shown in the open position.
Figure 2:
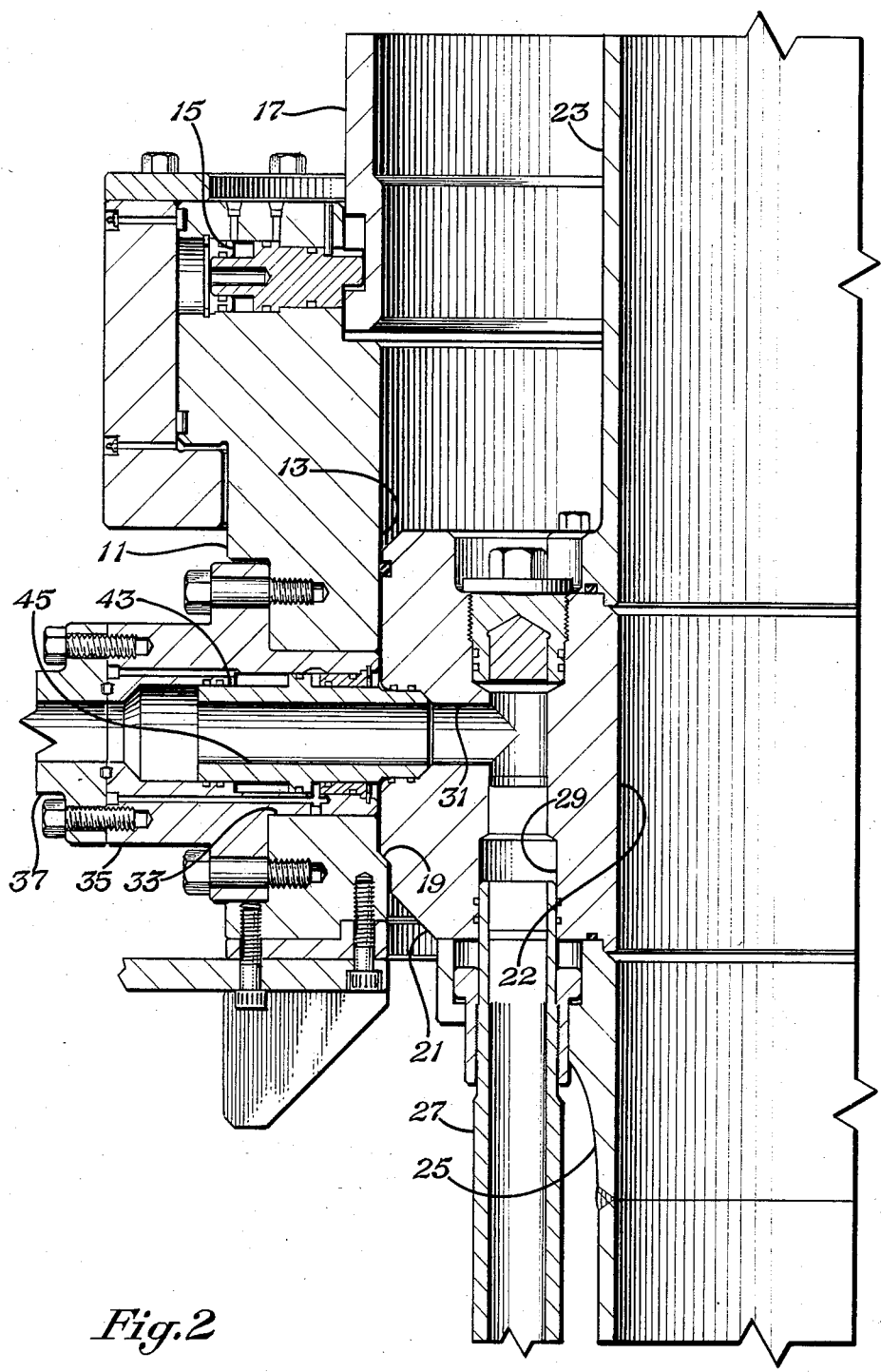
FIG. 2 is a partial vertical sectional view of the termination head and termination housing of FIG. 1, with the sliding sleeve shown in a closed position.

Referring to FIG. 1, termination housing 11 is a generally cylindrical member, having an inner cylindrical cavity 13. The axis of the termination housing 11 and cavity 13 is normally vertical. When in use for storage, termination housing 11 may be rigidly secured to a floating vessel (not shown) by means of a latch 15 which engages a diverter housing 17. Latch 15 is shown in an open position in FIG. 1 and a closed position in FIG. 2. When in use, termination housing 11 will be suspended below the diverter housing 17 on cables (not shown) to accommodate wave movement of the vessel. An annular shoulder 19 is located at the lower end of cavity 13 and faces upwardly.

A termination head 21 is adapted to slide downwardly into the inner cavity 13 and locate on the shoulder 19. A latch (not shown) will latch the termination head 21 in place. Termination head 21 has an axial bore 22. A tubular member 23 engages the termination head 21. Member 23 cooperates with other equipment (not shown) to lower and raise the termination head 21 with respect to the termination housing 11. A riser adapter joint 25 is secured to the lower end of the termination head 21 and extends downwardly to a string of risers (not shown) that extends to the subsea well (not shown). A plurality of flow lines 27 (only one shown) are mounted concentrically around the riser adapter joint 25 and the riser string. The flow lines 27 can deliver fluids to and receive fluids from the subsea well for control and production purposes.

The flow lines 27 each connect with a longitudinal passage 29 (only one shown) that extends upwardly within the termination head 21. Each longitudinal passage 29 intersects a radial passage 31 that extends through the cylindrical surface of the termination head. Referring to FIG'S. 3 and 4a, counterbore 31a is located at the outer surface or entrance of the radial passage 31. Two elastomeric seals 32 are shown located within the counterbore 31a. The termination housing 11 has a radial passage 33 for each termination head radial passage 31. The radial passages 33 (only one shown) are co-axial with the radial passages 31. Each housing radial passage 33 contains a fixed cylinder 35, which is bolted to the termination housing 11 and may be considered a part of housing 11. A hose adapter 37 is connected to the outer side of each cylinder 35. Each hose adapter 37 is connected to a hose (not shown), which extends to the floating vessel for transmitting fluids.

Figure 3:
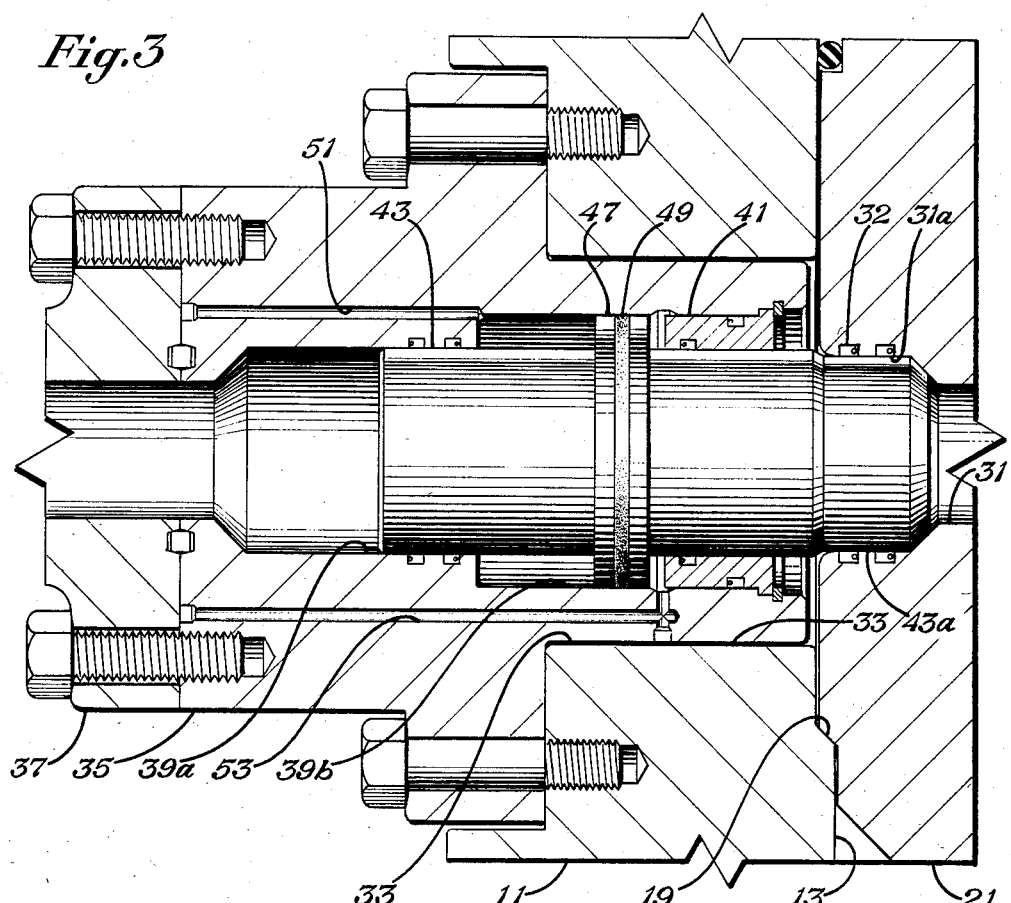
FIG. 3 is an enlarged, partial cross-sectional view of the sliding sleeve of FIG. 1, shown in a closed position.
Figure 4:
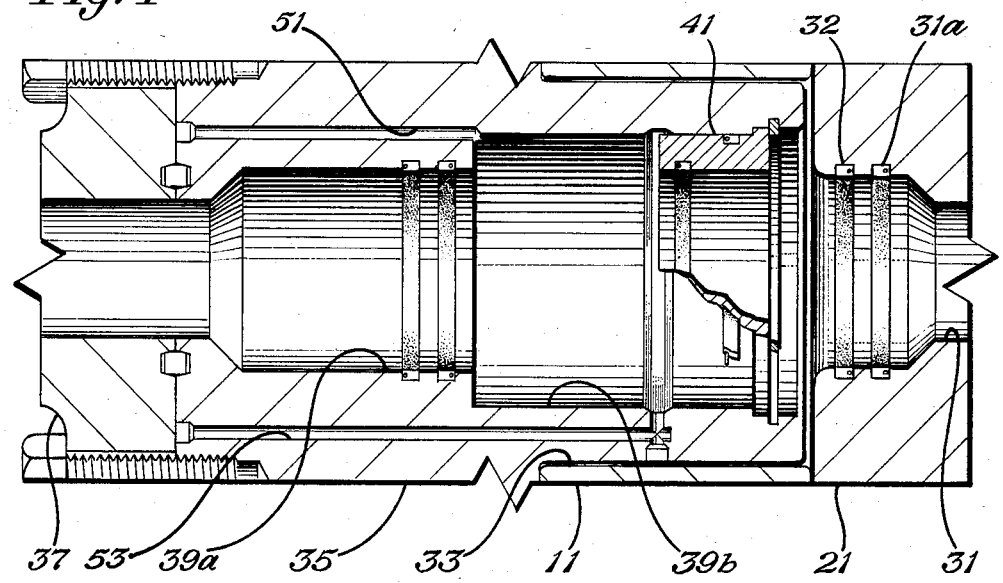
FIG. 4 is an enlarged partial view of the cylinder for the sleeve of FIG. 3, shown with the sleeve removed.

Referring to FIG. 3, the cylinder 35 has a passage therethrough with an outer or rearward end 39a and a forward end 39b. The forward end 39b has a greater diameter than the rearward end 39a. A stationary sleeve 41 is located near the forward end of the cylinder 35. Stationary sleeve 41 has an inner diameter that is the same as the inner diameter of the passage forward end 39a. Stationary sleeve 41 is spaced inwardly from the passage rearward end 39a a selected distance, to define a chamber for receiving hydraulic fluid. Passage portions 39a and 39b are coaxial with the termination head 11 passage 33.

A sliding sleeve 43 is reciprocally carried within the passage portions 39a and 39b. The sliding sleeve 43 has a forward or sealing end 43a that is of a lesser diameter than the innner diameters of the stationary sleeve 41 and passage portion 39a. The sealing end 43a is adapted to fit tightly and sealingly within the counterbore 31a of the termination head radial passage 31. Although seals 32 are shown in counterbore 31a, they could also be located on sealing end 43a. This would allow replacement of the seas 32 by removing the sliding sleeve 43.

Sliding sleeve 43 has a bore 45 therethrough (FIG. 1) for the transmission of fluids between the radial passage 31 and the bore of the hose adapter 37. Bore 45 is coaxial with radial passages 31 and 33. A flange 47 encircles the sliding sleeve 43 at a point between its ends. Flange 47 has a seal 49 and is closely received within the passage portion 39b between the stationary sleeve 41 and the passage portion 39a. Flange 47 serves as a piston for advancing and retracting the sliding sleeve 43. A hydraulic passage 51 extends from a source of hydraulic fluid (not shown) to the passage portion 39b on the outer or rearward side of flange 47. A hydraulic passage 53 also extends from a source of hydraulic fluid to the passage portion 39b, but on the forward side of flange 47.

In operation, the termination housing 11 will be supported from the floating vessel (not shown) as described in U.S. Pat. No. 4,403,658. The sliding sleeves 43 will be retracted as shown in FIG. 1 prior to lowering of the termination head 21 into the termination housing 11. Once lowered into place, the passages 31 in the termination head 21 will align with the sliding sleeves 43 in the termination housing 11. Hydraulic fluid pressure is applied through passage 51 to cause the sliding sleeve 43 to extend into the counterbore 31a. Passage 53 will serve as a return for the hydraulic fluid. Passages 51 and 53 are isolated from any fluid contained within the cylinder passage 39a. Once sliding sleeve 43 is in sealing engagement with the radial passage 31, fluid pressure may be applied through the hose adapter 37 and into the passage portion 39a. The fluid flows through the bore 45 (FIG. 1) and into the passages 31 and 29 in the termination head. The fluid is used at the subsea well for various functions.

The fluid pressure in the passage portion 39a will act on the rearward end of the sliding sleeve 43. The same fluid pressure will act on the forward end of the sliding sleeve 43. As can be seen in FIG'S. 1 and 2, the rearward edge has a greater cross-sectional thickness than the forward end because of its greater outer diameters. This greater cross-sectional thickness results in a larger pressure area on the rearward end of the sliding sleeve 43 than on the forward end of sliding sleeve 43 at sealing end 43a. The greater pressure area results in a net inward force, tending to push the sliding sleeve 43 inward, even though hydraulic fluid pressure is removed from the hydraulic passages 51 and 53.

When the termination head 21 is to be pulled upwardly from the termination housing 11, fluid pressure is removed from the passages within the hose adapter 37 and cylinder 35. Then, hydraulic fluid pressure is applied to hydraulic fluid passage 53, with return of hydraulic fluid allowed through passage 51. This causes the sliding sleeve 43 to retract from its sealing engagement with the radial passage 31 in the termination head 21.

The invention has significant advantages. The sliding sleeve assembly avoids any damage to the seals that might occur while the termination head is being lowered into the termination housing. The sliding sleeve utilizes internal pressure within the passage to maintain the seals in engagement, apart from any hydraulic fluid pressure used to reciprocate the sleeve from one position to the other. Loss of pressure or slight movement of the sleeve will not affect the seal. The sliding sleeve assembly can be moved slightly by means of its bolted connection to the termination housing to provide for final alignment with the termination head radial passage.

While the invention has been shown in only one of its forms, it should be apparent to those skilled in the art that it is not so limited but is susceptible to various changes without departing from the scope of the invention.

I claim:

1. In a fluid connection system for a subsea well having a termination head connected to a riser string, a termination housing having hose means connected to a floating vessel and a bore which releasably receives the termination head, the termination head and termination housing having passages transverse to the axis of the riser string that register with each other to transmit fluids through the hose means between the floating vessel and riser string, the improvement comprising in combination:

a sleeve having an axis and reciprocally carried in the termination housing passage, the sleeve having a bore therethrough, the sleeve having a forward end adapted to be received within the termination head passage;

seal means for sealing the exterior of the forward end of the sleeve to the interior of the termination head passage; and hydraulic means for moving the sleeve along its axis between an open position removed from the termination head passage to a closed position with its forward end sealingly located within the termination head passage, for the passage of fluid through the bore of the sleeve between the termination head and termination housing.

2. In a fluid connection system for a subsea well having a termination head connected to a riser string, a termination housing having a bore which releasably receives the termination head, the termination head and termination housing having passages transverse to the axis of the riser string that register with each other to transmit fluids between the riser string and a floating vessel, the improvement comprising in combination:

a sleeve having an axis and reciprocally carried in the termination housing passage, the sleeve having a bore therethrough, the sleeve having a cylindrical forward end adapted to be received within the termination head passage, the sleeve having an annular flange between its ends of enlarged diameter that is carried by the sleeve for movement in unison therewith and sealingly within an enlarged diameter section of the termination housing passage;

seal means for sealing the sleeve forward end within the termination head passage; and hydraulic passage means extending to the enlarged diameter section of the termination housing passage on opposite sides of the flange for applying hydraulic pressure on the flange to move the sleeve along its axis between an open position removed from the termination head passage to a closed position with its forward end sealingly located within the termination head passage for the passage of fluid through the bore of the sleeve between the termination head and termination housing.

3. In a fluid connection system for a subsea well having a termination head connected to a riser string, the termination head adapted to seat within a bore of a termination housing, which is connected by at least one hose to a floating vessel, the termination head and termination housing having passages transverse to the axis of the riser string that register with each other to transmit fluids through the hose between the floating vessel and riser string, the improvement comprising in combination:
- a sleeve having an axis reciprocally carried in the termination housing passage, the sleeve having a bore therethrough for the passage of fluid between the termination head and the termination housing, the sleeve having a reduced diameter forward end adapted to be received within the termination head passage, the sleeve having an integral annular flange of enlarged diameter that is located between its ends and carried within an enlarged diameter section provided in the termination housing passage;
- forward seal means for sealing the exterior cylindrical surface of the forward end within the termination head passage;
- flange seal means for sealing the exterior surface of the flange within the enlarged diameter section;
- hydraulic passage means extending to the enlarged diameter section of the termination housing passage on opposite sides of the flange for applying hydraulic pressure to the flange to move the sleeve along its axis between an open position removed from the termination head passage to a closed position with its forward end sealingly located within the termination head passage;
- the rearward end and the forward end of the sleeve each having pressure areas in communication with pressure of the fluid in the termination head and termination housing passages, the pressure area of the rearward end being larger than the pressure area of the forward end, resulting in a net forward force independent of pressure in the hydraulic passage means.

* * * * *